Dec. 13, 1960  R. J. McCRORY ET AL  2,964,026
FUEL INJECTION APPARATUS
Filed Dec. 2, 1957  2 Sheets-Sheet 1

INVENTORS
ROLLIN J. McCRORY
JOSEPH H. McNINCH
BRUCE UNDERWOOD
BY

Dec. 13, 1960 R. J. McCRORY ET AL 2,964,026
FUEL INJECTION APPARATUS
Filed Dec. 2, 1957 2 Sheets-Sheet 2

INVENTORS
ROLLIN J. McCRORY
JOSEPH H. McNINCH
BRUCE UNDERWOOD
BY

United States Patent Office 2,964,026
Patented Dec. 13, 1960

2,964,026

FUEL INJECTION APPARATUS

Rollin J. McCrory, Joseph H. McNinch, Jr., and Bruce Underwood, Columbus, Ohio, assignors, by mesne assignments, to The Battelle Development Corporation, Columbus, Ohio, a corporation of Delaware Filed Dec. 2, 1957, Ser. No. 700,168

10 Claims. (Cl. 123—65)

This invention relates to fuel-injection apparatus for internal-combustion engines. More particularly, it relates to a pressure-actuated fuel-injector system for two-stroke-cycle internal-combustion engines.

In two-stroke-cycle internal-combustion engines it has been found to be a definite advantage to use a fuel-injection system of fuel introduction rather than a carburetion system. The advantages obtained in the use of a fuel-injection system are to be found in greater efficiency and safer operation. This is because, in the conventional two-stroke-cycle, the exhaust ports are opened on the power stroke before the intake and scavenge ports are open. The exhaust ports remain open until after scavenging and intake air have been supplied and are closed on the compression stroke of the engine.

When a fuel-injection system is used, the fuel is injected on the compression stroke after the exhaust ports are closed on the compression stroke. If, on the other hand, the carburetion system were used, a portion of the fuel admitted with the intake air during scavenging would pass out through the exhaust ports before they were closed on the compression stroke. This fuel carried out through the exhaust system of the engine into the surrounding atmosphere is a loss of fuel from the combustion cycle and produces a lower operating efficiency for the engine. This lowered efficiency by reason of the waste of fuel has been found to be as much as 30 percent in certain cases.

In addition to this lowered efficiency resulting from the loss of fuel to the surrounding atmosphere, in certain circumstances, the introduction of this fuel into the surrounding space may be a safety hazard by the provision of a combustible mixture in the vicinity of the engine. This latter disadvantage would be more acute in situations where the engine is located in a confined space. The hazard would be still further increased when gaseous fuel is being burned in the engine.

For example, when a free-piston two-stroke-cycle internal-combustion engine burning natural gas is used as the source of power for a refrigeration compressor in an air conditioner for residential or other use and the compressor unit is in an enclosed area, it is apparent that the possibility of a combustible mixture existing in the vicinity of the engine is such a danger that the carburetion system could not be used. In addition, the lowered efficiency would make a compressor with this type of system noncompetitive with other types.

A fuel-injection system of fuel introduction provides the further advantage of better starting characteristics. Starting is better because the fuel is positively admitted on the first compression stroke of the engine under the external force of the fuel pressurizing system. On the other hand, in the carburetion system, the piston must be reciprocated more than once to introduce the fuel dispersion into the combustion cylinder from the carburetor. Usually, several rapid reciprocations are necessary. In starting free-piston engines, the rapid reciprocation of the piston more than once for an engine start would be very difficult.

It is important in many installations that the fuel-injector apparatus be of simplest design having very few moving parts so that the unit may be operated for long periods without maintenance. Most fuel-injection equipment in the past has been of complicated construction and operated by a source of rotary motion. Fuel-injection apparatus of this invention is of simple construction having very few moving parts, none of which have rotary motion.

The fact that this fuel-injection apparatus does not require a source of rotary motion for its operation is particularly advantageous in its combination with a free-piston engine. As is readily apparent, a free-piston engine has no source of rotary motion, all parts being constrained to motion of translation or reciprocation.

Briefly, this invention comprises apparatus including a pressure-actuated, positive displacement fuel injector in combination with a fuel-injector valve in the power cylinder of an internal-combustion engine. With the piston is a concomitant air chamber, the pressure in which varies, but which is high enough to actuate the pump at the time for fuel injection, and which is valved into communication with the fuel injector by the piston.

It is a purpose of this invention to provide fuel-injection apparatus which is capable of pumping and injecting fuel into the combustion cylinder of an engine by means integral with the engine and directly timed by the engine operation. It is further purpose to provide fuel-injection apparatus which is operable to inject gaseous fuel into the combustion cylinder of an internal-combustion engine from a low pressure source which may be at even less than atmospheric pressure. It is yet another object to provide fuel-injection apparatus which is actuated by the compression cylinder pressure of a free-piston engine.

A feature of this invention is the way an edge of the piston is used to open and close a port communicating with the fuel-injector apparatus of this invention. A further feature is the way in which the volume of fuel pumped and injected is positively controlled to a constant amount by the shape and construction of the diaphragm pump and injector valve combination. Another feature of this invention is the way that the injector valve is formed with a conical seat and shoulder so that the fuel is injected in a divergent annular path providing optimum fuel dispersion and burning characteristics.

To these and other ends, this invention comprises apparatus and a method of operating the same, a preferred form which is disclosed in the following description and attached drawings. Although the apparatus structure and method described and shown in detail refer with particularity to a free-piston, two-stroke-cycle, internal-combustion engine, operating on gaseous fuel, it is apparent that this invention should not be limited thereto. The invention is applicable to two-stroke-cycle engines of all types when properly constructed to utilize the advantages of the invention. The invention may be used in engines that are constructed to operate on liquid-fuel dispersions, and may be used for other purposes, where its features are advantageous.

The fuel injector of this invention operates to pump and inject gaseous fuel into the power cylinder of the free-piston engine to be described in detail. Although the fuel may be from a supply at a low pressure, the injector is effective. An example apparatus that has been built according to this invention, has operated effectively with a negative fuel pressure of 5 in. Hg. For a free-piston engine used to operate a refrigeration compressor for a residential air-conditioning unit, the natural gas or other similar gaseous fuel is available at about .5 p.s.i. gage as this is the usual urban supply pressure. The fuel-injector apparatus of this invention raises the pressure of the fuel supplied at this pressure, or even lower pressure, and injects fuel against power-cylinder compression pressure.

Figure 1:
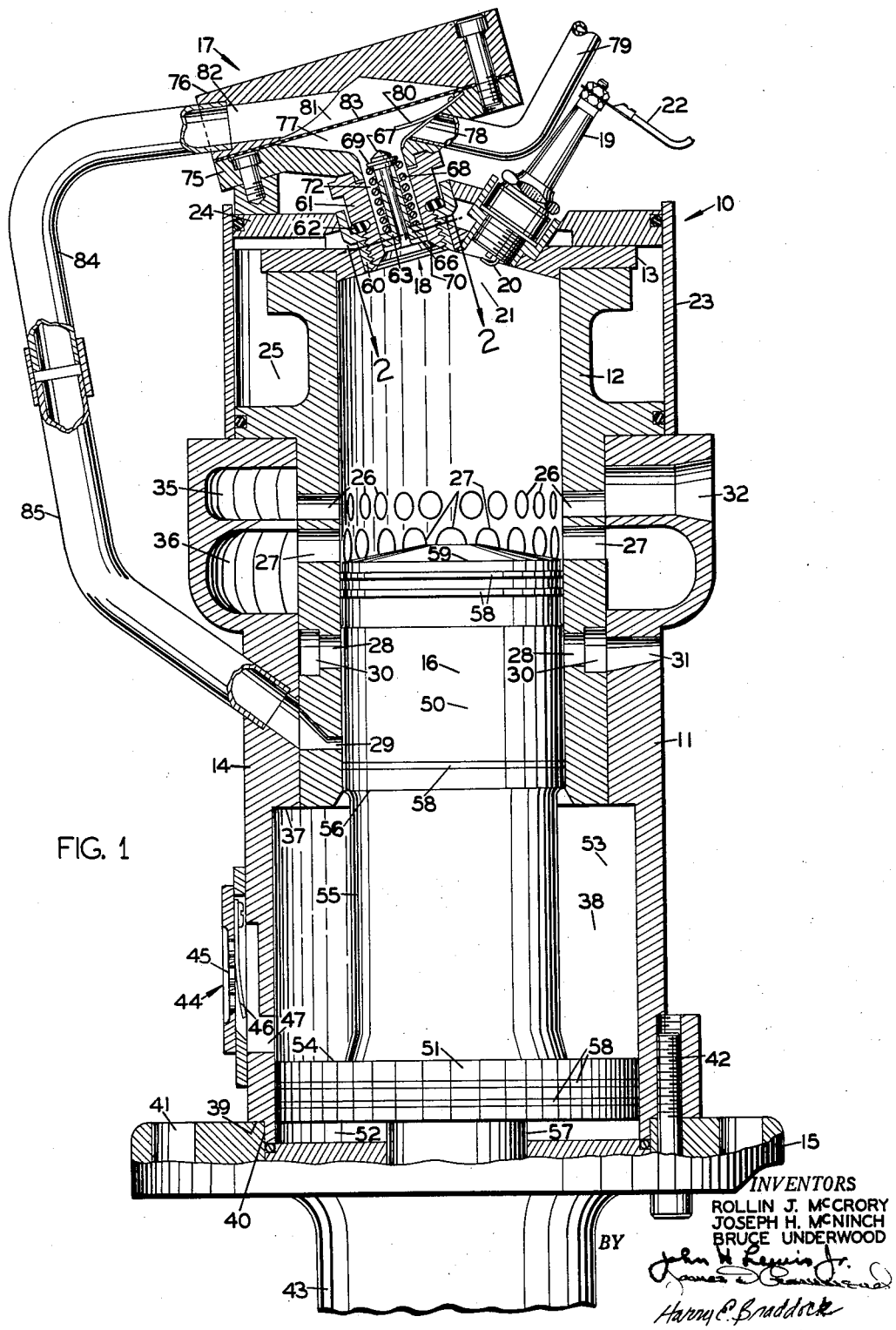
Fig. 1 is an elevational, sectional view of a free-piston two-stroke-cycle, internal-combustion engine having the fuel-injection apparatus of this invention combined therein.

Referring to Fig. 1, a two-stroke-cycle, free-piston, internal-combustion engine, designated generally as 10, comprises a composite frame structure 11, including a power cylinder 12, a cylinder head 13, a compression cylinder 14, and a mount member 15.

Reciprocably mounted within the frame 11 is a piston 16. Fuel-injection apparatus, designated generally as 17, is mounted on the engine and has a fuel-injector and dispersion valve 18 positioned in the cylinder head 13. An ignitor 19, such as a spark plug, is also disposed in the cylinder head 13, having an ignition element 20 in the head end 21 of the combustion cylinder 12. A means of supplying an electrical potential to the ignitor 19 through the lead wire 22 is usually provided for the engine, and may be of conventional type, and therefore is not shown.

Power cylinder 12 is shaped and formed to receive various cooperating parts, such as annular cover 23, over-head 24, and compression cylinder 14. Annular cover 23, in conjunction with over-head 24, and power cylinder 12, forms an annular coolant chamber 25. In progressively spaced position from the head end 21, the combustion cylinder 12 is provided with radially disposed exhaust ports 26, intake ports 27, spill ports 28, and a control port 29. Spill ports 28 empty into an annular "spill" manifold 30, which communicates at one side with a conduit 31 to the atmosphere.

Compression cylinder 14 is constructed to fit around power cylinder 12 for a portion of its length, and to provide in that portion, an annular exhaust manifold 35 in communication with exhaust ports 26, and an annular intake manifold 36 in communication with intake ports 27. The exhaust manifold 35 is open to the atmosphere through a passage 32 at one side. Intake manifold 36 is connected to a source of compressed air, by conventional means, not shown. At the opposite end, compression cylinder 14 is provided with an annular recess portion 37 which forms, in cooperation with power cylinder 12 and mount member 13, a compression chamber 38 of larger diameter than the power cylinder 12. The lower end of compression cylinder 14 is constructed with a shoulder 39 and flange 40 for joinder with mount member 15 in assembly. Mount member 15 may be provided with a hole 41 for use in mounting the engine on a supporting structure (not shown), and may be held in assembled relation with respect to compression cylinder 14 by means of circumferentially positioned bolts 42. Mount member 15 may be formed into a housing 43 for a compression unit or other useful application of the engine output energy; but which is not related to this invention and is therefore not shown.

Compression cylinder 14 is provided at one side with a low-inertia inlet check valve 44, such as one having a reed element 46. The inlet apertures 45 of valve 44 are uncovered by the flexure of the reed element 46 when pressure in the compression chamber 38 is less than atmospheric and an inlet port 47 is uncovered. Whenever the sum of the pressure in compression chamber 38 and the spring force of the reed 46 exceeds atmospheric pressure, check valve 44 will close.

The piston 16 is formed with a minor-diameter contact portion 50 which is adapted to reciprocate in the power cylinder 12, and a major-diameter contact portion 51 which is adapted to reciprocate in the compression cylinder 14. Major-diameter portion 51 divides compression chamber 38 into a bounce chamber 52 and a counter-chamber 53 which alternately increase and decrease in volume when piston 16 reciprocates. For purposes of description, minor-diameter portion 50 may be considered to extend from one side 54 of the major-diameter portion 51 to the head end 59 of the piston 16. For a portion of its length, the minor diameter portion 50 is formed with a recessed-diameter portion 55 which continues from a leading edge 56 to the one side 54 of the major-diameter portion 51. Piston 16 may have a connecting rod 57 or other suitable energy output means connected to the major-diameter portion 51. Sealing means, such as piston rings 58, are provided on the piston 16 to seal pressure conditions in each chamber.

Figure 2:
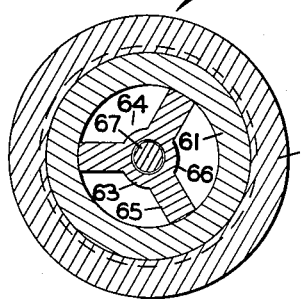
Fig. 2 is a sectional view taken along the line 2—2 of Fig. 1.
Figure 3:
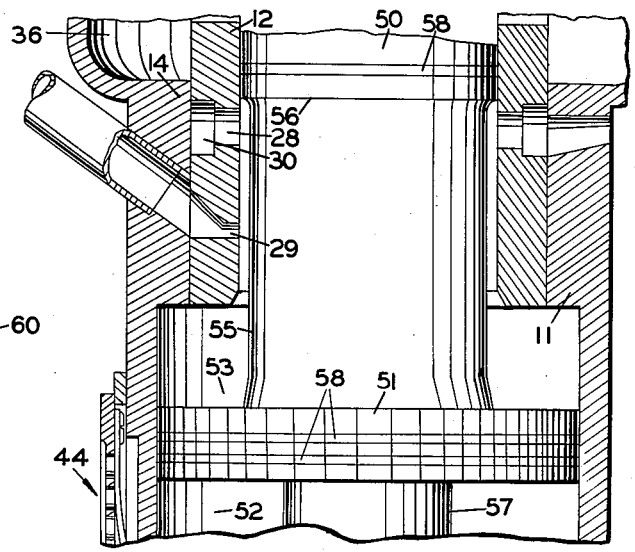
Fig. 3 is an enlarged sectional elevation view of a portion of the engine shown in Fig. 1 showing the piston at a different position in the engine.

A bushing 60 is fastened into cylinder head 13 and over-head 24 and is formed to threadedly receive a valve body 61 with a seal 62 therebetween. Valve body 61 is provided with a spinder member 63 (see Fig. 2), having radial apertures 64 and radial supporting arms 65, and having an upstanding columnar bushing portion 66. Columnar bushing 66 receives a stem 67, of the fuel injector valve 18 by sliding reciprocable fit. Resilient means 68, such as a compression spring, fits over bushing portion 66 and engages a collar 69 which is fastened to the end of stem 67.

By means of this assembly, injector valve 18 is urged to the closed position against a frustoconical seal 70 by spring 68 and by the pressure in power cylinder 12 acting on its face. When the pressure in throat 72 of valve body 61 creates a force on the inner face of the valve greater than the sum of the force from pressure in the power cylinder and the force of spring 68, spring 68 is compressed and the valve opens.

Fuel-injection apparatus 17 is mounted above and is assembled with valve body 61. The fuel-injection apparatus 17 comprises a lower pump portion 75 and an upper actuator portion 76. Lower pump portion 75 is provided with a conically formed chamber 77 in communication with throat 72. The pump chamber 77 is provided with a fuel inlet aperture 78 which receives a fuel inlet tube 79 at one side. A low-inertia check valve 80, which may be in the form of a reed valve, as shown, is disposed in a position to cover the inlet aperture 78.

In a similar fashion actuator portion 76 is provided with a conical chamber 81 having a laterally projecting inlet passage 82.

A flexible diaphragm 83 is clamped between pump portion 75 and actuator portion 76, forming a partition between pump chamber 77 and actuator chamber 78. The diaphragm may be of any suitable elastic material, such as neoprene, which is not adversely affected by the substances in the chambers 77 and 78. An inlet passage 82 is connected by means of conduits 84 and 85 into a position in the side of compression cylinder 14 and in communication with control port 29.

The operation of the engine and fuel injection apparatus is as follows:

The general operation of the engine 10 is in accordance with the usual procedure for two-stroke-cycle engines with the exception that the piston is returned on the compression stroke by compressed gas beneath the piston 16. In this two-stroke-cycle operation, the piston may be considered to start at the position shown in Fig. 1, moving upward on the compression stroke and closing the intake ports and the exhaust ports in succession. At the proper time a charge of fuel is admitted into the power cylinder 12 through the fuel injector valve 18. Further upward travel of the piston compresses the air-fuel mixture in the power cylinder 12. When the piston reaches a predetermined position, an electrical potential is transmitted through lead wire 22 to the ignitor 19 and a spark is generated at the ignitor elements 20 causing the combustible mixture to fire. Expansion of the combustion products in the power cylinder 12 forces the piston down on the power stroke successively opening the exhaust ports and the intake ports and compressing air in the bounce chamber 52 for the next compression stroke.

At the beginning of each cycle the piston is at bottom dead point, and the counterchamber pressure is atmospheric with the check valve 44 closed. Upward movement of the piston 16 compresses air in the counterchamber 53. At the proper time, the leading edge 56 of the recessed diameter portion 55 passes the control port 29 placing the counterchamber 53 in communication with the actuator chamber 81 of the fuel injector through conduits 84 and 85. The pressure in the actuator chamber 81 is immediately raised to that of the counterchamber 53 forcing the diaphragm 83 to be depressed into the pump chamber 77 and transmitting the actuator chamber 81 pressure to the fuel in the pump chamber 77. Pressure in the throat 72 is raised to a value sufficiently high to exert a greater force on the inside face of the fuel-injector valve 18 than the sum of the forces produced by the spring 68 and the force caused by the pressure on the opposite face. This causes the valve 18 to open and a predetermined amount of gaseous fuel to be injected around the edges. The depression of the diaphragm continues until it is in contact with the conical surface of the pump chamber 77.

At this point displacement of the diaphragm 83 ends. Fuel injection continues until the pressure in the throat 72 is reduced to the extent that the force of the spring 68 causes valve 18 to close.

Because of the conical shape of the seat 70, and the mating edge of the fuel injector valve 18, the fuel is dispersed in the power cylinder 12 in the form of a conical flow pattern which aids in the formation of a combustible mixture.

Further continued upward travel of the piston 16 brings the leading edge 56 of the recessed diameter portion 55 to register with the spill ports 28. Registry of the recessed diameter portion 55 with the spill port 28 places the counterchamber 53 and the actuator chamber 81 in communication with the atmosphere by reason of the connection of the spill manifold 30 and conduit 31. The pressure in the actuator chamber 81 is reduced, relieving the pressure on the diaphragm 83.

After the fuel-air mixture in the power cylinder 12 is ignited and the piston descends on the power stroke, the leading edge 56 passes the spill ports 28 sealing the counterchamber 53 and the actuator chamber 81 from the atmosphere. Continued downward movement of piston 16 reduces the pressure in the counterchamber 53 and actuator chamber 81 drawing the diaphragm 83 to a position of contact with the conical inner face of actuator chamber 81. This movement of the diaphragm 83 reduces the pressure in the pump chamber 77 and draws a predetermined amount of fuel from the fuel inlet aperture 78. The amount of fuel drawn into the pump chamber 77 will be substantially equal to the volumes of the pump and actuator chambers 77 and 81, respectively. This amount is a positively established predetermined amount because the limits of diaphragm displacement are positively established by the position and form of the conical faces of the chambers 81 and 77.

At the beginning of the fuel intake or suction stroke of the diaphragm 83, just described above, the check valve 80 moves to its open position by reason of the pressure differential across the valve. It will be seen therefore, that the fuel supply source, to which the fuel inlet tube 79 is attached may be a low pressure, and even may be less than atmospheric pressure, and the fuel will be drawn into the pump chamber 77.

Continued downward travel of the piston 16 brings the leading edge 56 past the control port 29 closing the actuator chamber 81 from communication with the counterchamber 53. This holds the low pressure then existing in the actuator chamber 81 while the piston continues downward. Further downward travel of piston 16 brings the edge of the major diameter portion 51 past the inlet port 47, and because the pressure in counterchamber 38 is less than atmospheric pressure, the check valve 44 opens allowing air to flow into the counterchamber 53. Air enters the counterchamber 53 until substantially atmospheric pressure is reached. At this time the fuel-injection system is ready for the commencement of the next stroke, and therefore will consecutively repeat its operation on successive strokes as described herein for the single stroke.

It is to be noted that since the head end 59 of the piston 16 covers the intake 27 and exhaust 26 ports, before fuel is injected from the injector valve 18, there can be no exhaust of the combustible fuel through the exhaust port 26, unless there is a misfire. More than one or two consecutive misfires would cause the engine to stop and this number of piston reciprocations would not provide sufficient fuel to form a combustible mixture in the atmosphere surrounding the engine, therefore, there can be no danger by reason of misfires.

The fuel-injection apparatus disclosed provides for construction that is integral with the engine. Construction is simple and inexpensive and contains only three moving parts in addition to the parts normally found in an engine. The only additional moving parts are the fuel-injector valve 18, the resilient means 68, and the diaphragm 83. An integral part of the fuel-injection system is the piston 16 itself. Thus, it will be seen that the part of the fuel-injection system which has the most movement is a normal essential part of the engine.

It is further evident that the fuel-injection timing is positively controlled in accordance with the position of the leading edge 56, and the control port 29.

Although, the amount of fuel injected will be substantially constant under normal supply pressure regulation, it may be desirable in some instances to provide a fuel pressure regulator in the fuel inlet line 79 as a means of providing constant gaseous fuel delivery conditions.

While the diaphragm type of fuel injector shown is preferred, a piston-cylinder type could be used under some circumstances. In this construction, a piston is reciprocably mounted in a cylinder having closures at each end. The piston partitions the cylinder into a pumping chamber and an actuator chamber in the same manner as the diaphragm 83 divides the injector 17. Variation in pressure in the actuator chamber causes the piston to move in the cylinder and to pump fuel to a fuel-injection valve. Other parts of the apparatus would be the same otherwise, i.e., the actuator chamber would be connected to a control port 29, and the pumping chamber would be connected to a fuel inlet tube 79 and to the fuel dispersion valve 18.

It will be understood, of course, that while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts may be substituted without departing from the spirit or scope of the invention herein disclosed.

What is claimed is:

1. In an internal-combustion engine; a frame; a power cylinder and a compression cylinder in said frame; a piston reciprocable in said cylinders; fuel injection means mounted with said frame having pressure-responsive fuel-discharge means in communication with said power cylinder, having pressure-responsive fuel-influx means in communication with a source of fuel and having pressure-responsive actuator means in communication with said power cylinder; and communication means in a portion of said piston for sequentially establishing fluid connection between said compression cylinder and said pressure-responsive actuator means at a first position during displacement of said piston, and between said pressure-responsive actuator means and the atmosphere at a second position during the continued displacement of said piston, said pressure-responsive actuator means opening said fuel-discharge means responsively to the pressure in said compression cylinder on reciprocation of said piston to said first position, said fuel discharge means closing responsively to the pressure in said power cylinder on further reciprocation of said piston past said first position, and said pressure-responsive actuator means opening said fuel influx means responsively to the pressure in said compression cylinder on reciprocation of said piston from said second position.

2. In an internal-combustion engine a frame; a power cylinder and a compression cylinder in said frame; a piston reciprocable in said cylinders; a fuel injector mounted with said frame comprising a diaphragm-type pressure-actuated fuel pump in communication with a valve having an outlet in said power cylinder and having communication means between said fuel injector and said power cylinder; a recess in a portion of said piston for sequentially establishing fluid communication between said compression cylinder and said fuel injector through said power cylinder at a first position during displacement of said piston and between said fuel pump and the atmosphere at a second position during the continued displacement of said piston; whereby said fuel pump is actuated to force fuel through said outlet when said piston is at said first position.

3. In an internal-combustion engine; a frame; a power cylinder in said frame; a compression cylinder mounted in connection with said power cylinder; a piston mounted for reciprocable movement in said cylinders and operable to vary the pressure in said compression chamber responsively to said said reciprocable movement; a pressure-actuated fuel injector mounted on said frame having an outlet in communication with said power cylinder; a first port in the wall of said power cylinder in communication with said pressure-actuated fuel injector; and a second port in the wall of said power cylinder in communication with the atmosphere; and means on said piston for sequentially placing said first port in communication with said compression cylinder to actuate said fuel injector and for placing said first port in communication with said second port, on reciprocation of said piston.

4. In an internal-combustion engine; a frame; a power cylinder in said frame and a compression cylinder in said frame of greater diameter than said power cylinder; a piston reciprocable in said cylinders having a major diameter portion reciprocable in said compression cylinder and a minor diameter portion reciprocable in said power cylinder; a pressure-actuated positive displacement fuel injector having an actuator chamber at one side, a fuel-pumping chamber at the oppoiste side, and a displaceable partition member therebetween; said fuel-pumping chamber having a check valve at an inlet aperture thereto and a check valve at a discharge aperture therefrom with said discharge valve in communication with said power cylinder; a first port in said power cylinder in communication with said actuator chamber of said pump; a second port in said power cylinder in communication with the atmosphere; a recessed portion having a leading edge on said piston in communication with said compression cylinder, said leading edge uncovering sequentially said first port and said second port on reciprocation of said piston and actuating said displaceable partition member by means of the pressure change in said compression cylinder, said actuation alternating the pressure in said fuel-pumping chamber to alternately open and close said discharge valve and said inlet valve, injecting fuel into said power cylinder in coordination with the reciprocation of said piston.

5. In an internal-combustion engine; a frame; a power cylinder in said frame; a compression cylinder in said frame interconnecting with and of greater diameter than said power cylinder; a piston reciprocable in said cylinders having a major diameter portion reciprocable in said compression cylinder and minor diameter portion reciprocable in said combustion cylinder; a pressure-actuated positive-displacement fuel injector having a spring-loaded pressure-responsive fuel dispersion valve in communication with said power cylinder; a first port in said combustion cylinder in communication with said injector; a second port in said power cylinder at a position between said first port and said valve and in communication with the atmosphere; and communication means on said piston from a position adjacent said major diameter portion to an intermediate position removed from the end of said minor diameter portion, said communication means uncovering sequentially said first and second ports on reciprocation of said piston and actuating said injector by means of pressure change in said compression cylinder, said injector actuation alternating the pressure on said pressure-responsive fuel dispersion valve, and alternately opening and closing said fuel dispersion valve, injecting fuel into said combustion cylinder in coordination with the reciprocation of said piston.

6. In an internal-combustion engine; a frame; a power cylinder in said frame; a compression cylinder in said frame, interconnecting with and of greater diameter than said power cylinder; a piston reciprocable in said cylinders having a major diameter portion reciprocable in said compression cylinder and a minor diameter portion reciprocable in said power cylinder; a pressure-actuated positive-displacement fuel injector having a spring-actuated pressure-responsive fuel dispersion valve in communication with said combustion cylinder; a first port in said power cylinder in communication with said injector; a second port in said combustion cylinder at a position between said first port and said valve and communication with the atmosphere; and a recessed portion on said piston in communication with said compression cylinder, the leading edge of said recessed portion uncovering sequentially said first port and said second port on reciprocation of said piston and actuating said injector by means of pressure change in said compression cylinder, said injector actuation alternating the pressure on said pressure-responsive fuel dispersion valve, and alternately opening and closing said fuel dispersion valve, injecting fuel into said power cylinder in coordination with the reciprocation of said piston.

7. In an internal-combustion engine; a frame; a power cylinder in said frame; a compression cylinder in said frame, interconnecting with and of greater diameter than said power cylinder; a piston reciprocable in said cylinders having a major diameter portion reciprocable in said compression cylinder and a longitudinally spaced minor diameter portion reciprocable in said power cylinder; a pressure-actuated diaphragm fuel-injector dispersion valve in communication with said power cylinder; a first port in said power cylinder in communication with said fuel injector; a second port in said power cylinder at a position between said first port and said fuel dispersion valve and in communication with the atmosphere; an axially disposed recess on said piston from a position adjacent said major diameter portion to an intermediate position removed from the end of said minor diameter portion, in communication with said compression cylinders the leading edge of said recess sequentially uncovering said first port and said second port on reciprocation of said piston, and actuating said diaphragm by means of the pressure change in said compression cylinder, said diaphragm actuation alternating the pressure in said fuel injector, alternately opening and closing said fuel dispersion valve injecting fuel into said power cylinder in coordination with the reciprocation of said piston.

8. In an internal-combustion engine; a frame; a power cylinder in said frame having a closure at one end; a compression cylinder in said frame, coaxial with and of greater diameter than said power cylinder, a piston reciprocable in said cylinders having a major diameter portion reciprocable in said compression cylinder and a longitudinally spaced minor diameter portion reciprocable in said power cylinder; a diaphragm fuel injector having an actuator chamber at one side and a fuel-pumping chamber at the opposite side, said fuel-pumping chamber having a spring-actuated pressure-responsive fuel dispersion valve in communication with said power cylinder; a control port in said power cylinder at a position remote from said one end, said control port in communication with said actuator chamber of said injector; a spill port in said power cylinder at a position between said first port and said one end in communication with the atmosphere; and communication means on said piston from a position adjacent said major diameter portion to an intermediate position removed from the end of said minor diameter portion and in communication with said compression cylinder, said communication means uncovering sequentially said control port and said spill port on reciprocation of said piston and actuating said diaphragm by means of the pressure change in said compression cylinder, said diaphragm actuation alternating the pressure in said fuel-pumping chamber, alternately opening and closing said fuel dispersion valve injecting fuel into said power cylinder in coordination with the reciprocation of said piston.

9. In an internal-combustion engine; a frame; a power cylinder in said frame having a closure at one end, and a coaxial interconnecting compression cylinder in said frame, coaxial with and of greater diameter than said power cylinder, a piston reciprocable in said cylinders having a major diameter portion reciprocable in said compression cylinder and a longitudinally spaced minor diameter portion reciprocable in said power cylinder; a pressure-actuated positive-displacement diaphragm fuel injector having an actuator chamber at one side and a fuel-pumping chamber at the opposite side, said fuel-pumping chamber having a check valve at an inlet thereto and a pressure-responsive fuel-dispersion check valve at a discharge aperture therefrom, said discharge valve in communication with said power cylinder; a control port in said power cylinder at a position remote from said one end, and in communication with said actuator chamber of said pump; a spill port in said combustion cylinder at a position between said control port and said one end, and in communication with the atmosphere; and a recess on the outer periphery of said minor diameter portion of said piston from a position adjacent said major diameter portion to an intermediate position removed from the end of said minor diameter portion in communication with said compression cylinder, the leading edge of said recessed portion uncovering sequentially said control port and said spill port on reciprocation of said piston and actuating said diaphragm by means of the pressure change in said compression cylinder, said diaphragm actuation alternating the pressure in said fuel-pumping chamber to alternately open and close said discharge valve and said inlet valve, injecting fuel into said power cylinder in coordination with the reciprocation of said piston.

10. In an internal-combustion engine; a frame; a power cylinder in said frame having a closure at one end, and a coaxial interconnecting compression cylinder in said frame, coaxial with and of greater diameter than said power cylinder, said compression cylinder having an inwardly acting intake check valve, in said frame; a piston reciprocable in said cylinders having a major diameter portion reciprocable in said compression cylinder and a longitudinally spaced minor diameter portion reciprocable in said power cylinder, a pressure-actuated positive-displacement diaphragm fuel injector having an actuator chamber at one side and a fuel-pumping chamber at the opposite side, said fuel-pumping chamber having an inlet check valve at an inlet thereto and a spring-actuated pressure-responsive fuel dispersion check valve of conical form at a discharge aperture therefrom, said discharge valve in communication with said power cylinder; a control port in said power cylinder at a position remote from said one end, and in communication with said actuator chamber of said pump; a spill port in said combustion cylinder at a position between said control port and said one end and in communication with the atmosphere; and a recess on the outer periphery of said minor diameter portion of said piston from a position adjacent said major diameter portion to an intermediate position removed from the end of said minor diameter portion in communication with said compression cylinder, the leading edge of said recessed portion uncovering sequentially said control port and said spill port on reciprocation of said piston and actuating said diaphragm by means of the pressure change in said compression cylinder, said diaphragm actuation alternating the pressure in said fuel-pumping chamber to alternately open and close said discharge valve and said inlet valve injecting fuel into said power cylinder in coordination with the reciprocation of said piston.

References Cited in the file of this patent

UNITED STATES PATENTS

| | | |
|---|---|---|
| 33,936 | Fitzgerald | Dec. 17, 1861 |
| 999,832 | Milburn | Aug. 8, 1911 |
| 2,301,503 | Barton | Nov. 10, 1942 |
| 2,361,502 | Sandhofer | Oct. 31, 1944 |
| 2,446,830 | Hirschberg | Aug. 10, 1948 |
| 2,598,147 | Tescher | May 27, 1952 |
| 2,602,702 | Kovach | July 8, 1952 |
| 2,723,653 | Blake et al. | Nov. 15, 1955 |
| 2,744,511 | Kauffmann et al. | May 8, 1956 |

FOREIGN PATENTS

| | | |
|---|---|---|
| 1,064,017 | France | Dec. 23, 1953 |